(12) United States Patent
Cecil

(10) Patent No.: US 11,959,412 B2
(45) Date of Patent: Apr. 16, 2024

(54) PISTONS AND PISTON ASSEMBLIES FOR INTERNAL COMBUSTION ENGINES

(71) Applicant: Cummins Inc., Columbus, IN (US)

(72) Inventor: Adam C. Cecil, Columbus, IN (US)

(73) Assignees: Cummins Inc., Columbus, IN (US); Achates Power, Inc., San Diego, CA (US)

( * ) Notice: Subject to any disclaimer, the term of this patent is extended or adjusted under 35 U.S.C. 154(b) by 0 days.

(21) Appl. No.: 17/661,778

(22) Filed: May 3, 2022

(65) Prior Publication Data

US 2022/0356834 A1 Nov. 10, 2022

Related U.S. Application Data

(60) Provisional application No. 63/183,859, filed on May 4, 2021.

(51) Int. Cl.
| | |
|---|---|
| *F01P 1/04* | (2006.01) |
| *F01P 3/08* | (2006.01) |
| *F02F 3/18* | (2006.01) |
| *F16J 1/00* | (2006.01) |
| *F16J 1/18* | (2006.01) |

(52) U.S. Cl.
CPC ................. *F01P 3/08* (2013.01); *F02F 3/18* (2013.01); *F16J 1/005* (2013.01); *F16J 1/18* (2013.01)

(58) Field of Classification Search
CPC ........... F16J 1/16; F16J 1/18; Y10T 29/49266
USPC ....................................................... 123/41.35
See application file for complete search history.

(56) References Cited

U.S. PATENT DOCUMENTS

| | | | |
|---|---|---|---|
| 3,380,789 A * | 4/1968 | Nigh | F16J 1/14 384/155 |
| 3,480,113 A * | 11/1969 | Appleby | F16J 1/08 184/14 |
| 3,789,743 A | 2/1974 | Sihon | |
| 3,877,350 A * | 4/1975 | Earley | F16J 1/16 74/587 |
| 4,721,073 A * | 1/1988 | Naruoka | F02B 41/04 123/48 B |
| 5,072,654 A | 12/1991 | MacGregor | |
| 5,086,736 A * | 2/1992 | Wiemann | F02F 3/225 92/158 |
| 5,112,145 A | 5/1992 | MacGregor | |
| 6,513,477 B1 * | 2/2003 | Gaiser | F16J 1/08 123/193.6 |
| 7,051,684 B2 | 5/2006 | Bauer | |
| 7,107,893 B2 | 9/2006 | Weinkauf et al. | |
| 7,647,863 B2 | 1/2010 | Issler et al. | |
| 8,511,261 B2 | 8/2013 | Maruyama et al. | |
| 9,212,622 B2 | 12/2015 | Kosheleff | |
| 9,581,187 B2 * | 2/2017 | Kessler | F16C 33/1065 |
| 9,605,619 B2 | 3/2017 | Pisila et al. | |

(Continued)

FOREIGN PATENT DOCUMENTS

| | | |
|---|---|---|
| DE | 19511997 C1 | 6/1996 |
| JP | 2007 278220 A | 10/2007 |

*Primary Examiner* — Long T Tran
*Assistant Examiner* — James J Kim
(74) *Attorney, Agent, or Firm* — Taft Stettinius & Hollister LLP

(57) ABSTRACT

Pistons and piston assemblies for an internal combustion engine is provided. The piston assembly includes a piston coupled to a connecting rod with a piston pin. The piston pin includes a non-circular outer cross-sectional shape.

20 Claims, 17 Drawing Sheets

(56) References Cited

U.S. PATENT DOCUMENTS

| | | | |
|---|---|---|---|
| 10,690,176 B2 | 6/2020 | Leone et al. | |
| 2002/0066423 A1* | 6/2002 | Moloney | F02F 3/22 |
| | | | 123/41.35 |
| 2009/0114087 A1 | 5/2009 | Fezer | |
| 2011/0185889 A1* | 8/2011 | Muscas | F02F 3/22 |
| | | | 92/158 |
| 2014/0238360 A1* | 8/2014 | Dion | F16J 1/16 |
| | | | 384/155 |
| 2015/0159583 A1* | 6/2015 | Pisila | F16J 1/18 |
| | | | 123/193.6 |
| 2016/0186686 A1* | 6/2016 | Azevedo | F02F 3/003 |
| | | | 123/41.38 |
| 2017/0284545 A1* | 10/2017 | Lapp | F16J 1/16 |
| 2018/0202552 A1* | 7/2018 | Turkall | F16J 1/18 |
| 2019/0264633 A1* | 8/2019 | Weinenger | F02F 3/22 |
| 2020/0392982 A1* | 12/2020 | Kessler | F16C 7/06 |

* cited by examiner

PISTONS AND PISTON ASSEMBLIES FOR INTERNAL COMBUSTION ENGINES

CROSS-REFERENCE TO RELATED APPLICATION

The present application claims priority to, and the benefit of the filing date of, U.S. Provisional Application Ser. No. 63/183,859 filed on May 4, 2021, which is incorporated herein by reference.

GOVERNMENT RIGHTS

This invention was made with government support under Other Transaction Authority (OT) agreement number W56HZV-16-9-0001, awarded by the United States Army. The government has certain rights in the invention.

FIELD OF THE INVENTION

The present disclosure relates generally to a piston assembly for an internal combustion engine, and more particularly, to a piston assembly with a non-circular piston pin.

BACKGROUND

Certain engines employ a two-stroke combustion cycle and/or opposed piston engine configuration. The nature of the two-stroke operating cycle does not allow the pin in the piston to unload since positive pressure is always acting on the pin joint. This type of loading is different from a loading the piston pin experiences in a four-stroke engine.

DISCLOSURE OF ILLUSTRATIVE EMBODIMENTS

For the purposes of clearly, concisely and exactly describing illustrative embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY OF THE DISCLOSURE

The present disclosure relates to a piston assembly for an internal combustion engine. The piston assembly includes a piston, a connecting rod, and a piston pin coupling the connecting rod to the piston. The piston pin can be coupled directly to the piston, or to a piston cage that is coupled to the piston.

In an embodiment, the piston pin that couples the connecting rod to the piston includes a cylindrical piston pin body. The cylindrical piston pin body includes a first surface configured to be engaged to the connecting rod with the body positioned in the piston to couple the connecting rod to the piston. The body extends along a longitudinal axis that is transverse to the connecting rod. The body includes an outer surface extending around the longitudinal axis from the first surface. The outer surface has a non-circular shape around the longitudinal axis.

In an embodiment, a piston assembly for an internal combustion engine is provided. The piston assembly includes a piston that is movable along a cylinder bore of the internal combustion engine. The piston includes an upper portion and a lower portion. The piston includes a crown in the upper portion. A piston pin extends along a longitudinal axis transversely to the piston. The piston pin is coupled to the piston below the crown. The piston pin includes an outer surface extending around the longitudinal axis. The outer surface has a non-circular shape so that gaps for receiving fluid are created between the piston pin and the upper portion of the piston in response to the piston moving reciprocally in the cylinder bore.

In an embodiment, a piston cooling arrangement is provided for an internal combustion engine. The piston cooling arrangement includes a piston configured to move reciprocally in a cylinder bore of the internal combustion engine. Piston also includes at least one inlet port for fluid and at least one outlet port for the fluid. The at least one inlet port is configured to direct cooling fluid flowing into the piston from a first trajectory to a second trajectory.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF ILLUSTRATIVE EMBODIMENTS

Figure 1:
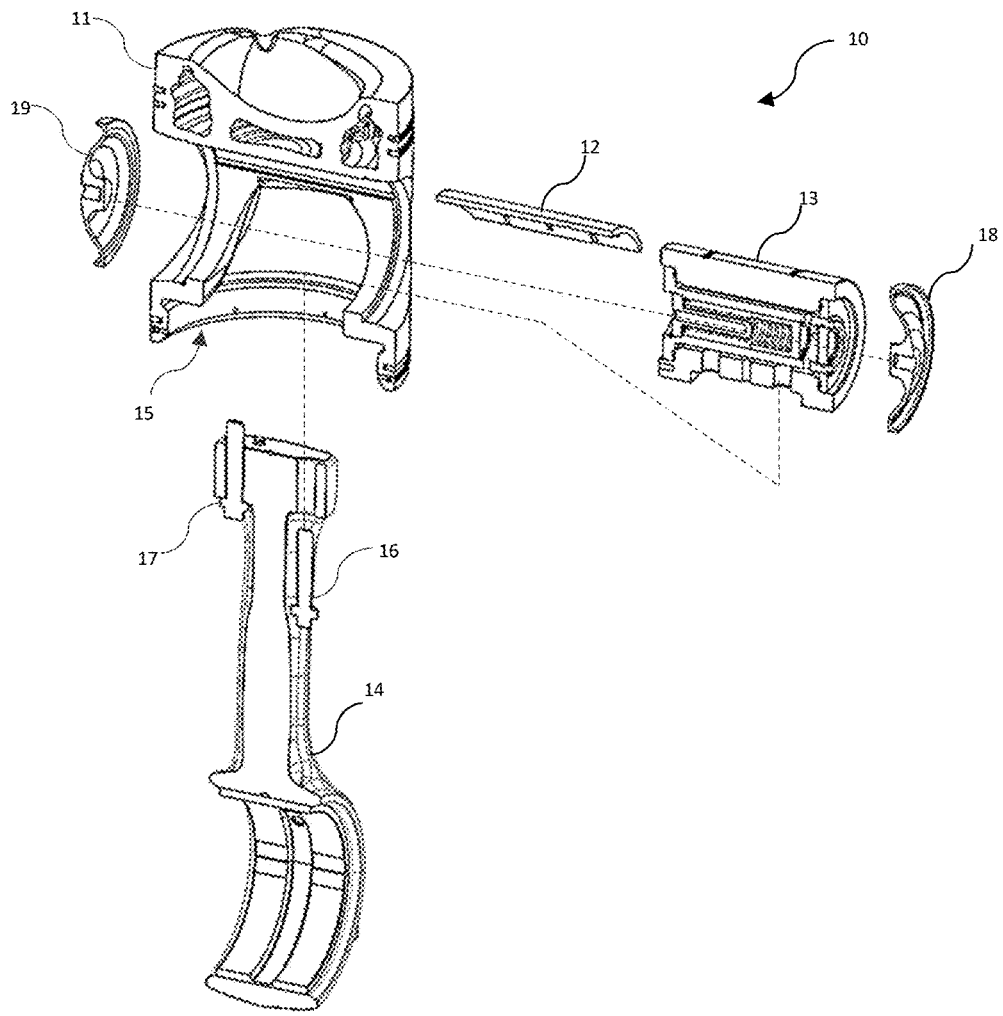
FIG. 1 is an exploded perspective view illustrating one embodiment piston assembly for an internal combustion engine.

Assemblies between a piston and the piston pin connecting the piston to the connecting rod are described herein. The present disclosure relates to a piston assembly 10, 100, 200, 300 for an internal combustion engine 50 in FIGS. 1-21. The piston assembly 10, 100, 200, 300 includes a piston 11, 102, 202, 302, a connecting rod 14, 114, 214, and a piston pin 13, 104, 204, 304 coupling the connecting rod 14, 114, 214 to the piston 11, 102, 202, 302.

In an embodiment, such as shown in FIGS. 4-21, a piston pin 102, 202, 302 couples the connecting rod 114, 214, 314 to the piston 102, 202, 302. The piston pin 102, 202, 302 includes cylindrical piston pin body 180 that has a first surface 115, 184 configured to be engaged to the connecting rod 114, 214, 314 while positioned in the piston 102, 202, 302 to couple the connecting rod 114, 214, 314 to the piston 102, 202, 302. The body 180 extends along a longitudinal axis L that is transverse to the connecting rod 114, 214, 314 when engaged to the connecting rod 114, 214, 314. The body 180 includes an outer surface 182 extending around the longitudinal axis L from the first surface 115, 184. The outer surface 182 has a non-circular shape around the longitudinal axis L.

In an embodiment, a piston assembly 100, 200, 300 for internal combustion engine 50 is provided. The piston assembly 100, 200, 300 includes a piston 102, 202, 302 that is movable along a cylinder bore 52 the of the internal combustion engine 50. The piston 102, 202, 302 includes an upper portion 119 and a lower portion 121. The piston 102, 202, 302 includes a crown 118, 218, 319 in the upper portion. A piston pin 104, 204, 304 extends along a longitudinal axis L transversely to the piston 102, 202, 302. The piston pin 104, 204, 304 is coupled to the piston 102, 202, 302 below the crown 118, 218, 319. The piston pin 104, 204, 304 includes an outer surface 182 extending around the longitudinal axis L. The outer surface 182 has a non-circular shape so that gaps for receiving fluid are created between the piston pin 104, 204, 304 and the upper portion 119 of the piston 102, 202, 302 in response to the piston 102, 202, 302 moving reciprocally in the cylinder bore 52.

In an embodiment, a piston cooling arrangement 301 is provided for an internal combustion engine 50. The piston cooling arrangement 301 includes a piston 102, 202, 302 configured to move reciprocally in a cylinder bore 52 of the internal combustion engine 50. Piston 102, 202, 302 also includes at least one inlet port 320, 324 for fluid and at least one outlet port 322, 326 for the fluid. The at least one inlet port 320, 324 is configured to direct fluid flowing into the piston 102, 202, 302 from a first trajectory to a second trajectory, such as toward a center of a crown 118, 218, 319.

FIG. 1 illustrates an example of a piston assembly 10 employing a bi-axial piston pin arrangement. In FIG. 1, the piston assembly 10 includes a piston 11 having a bearing shell 12 and a piston pin 13 inserted therein. The piston assembly 10 also includes a connecting rod 14 inserted into a bottom portion 15 of the piston 11 and is attached to the piston pin 13 with cap screws 16 and 17. At opposite sides of the piston pin 13 are circular pin bore plugs 18 and 19 pressed into the piston 11 to keep lubrication and/or cooling fluid such as lube oil from migrating from inside of the piston 11 to a cylinder bore (not shown). In a two-stroke engine application for piston assembly 10, the pin bore plugs 18 and 19 prevent lubrication fluid from migrating to intake ports or exhaust ports located on the wall of the cylinder bore.

Figure 2:
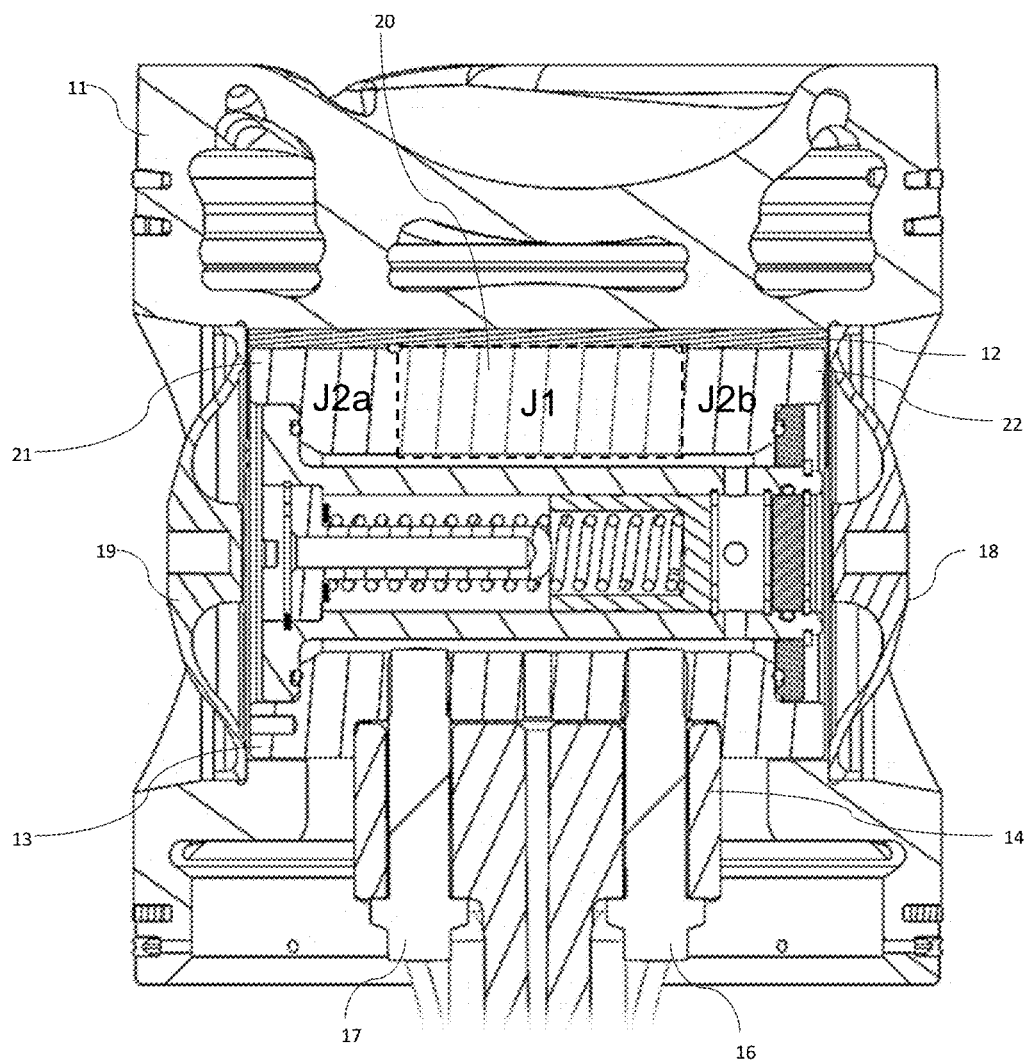
FIG. 2 is a cross-sectional view through a longitudinal axis of a piston pin of the piston assembly of FIG. 1.

FIG. 2 illustrates a cross-sectional view through an axis of the piston pin 13. In FIG. 2, the bearing shell 12 interfaces with bearing zones 20, 21, and 22. Bearing zone 20 is a central zone ("J1") with bearing zones 21 and 22 being identical outer zones ("J2a" and "J2b") at opposite sides thereof. The upper half of the piston 11 contains the bearing shell 12 since the piston 11 is always loaded via cylinder pressure under normal operating conditions in a two-stroke engine. During overspeed conditions of engine operation, inertial loading of the piston 11 overcomes cylinder pressure and unloads the bearing shell 12. As used herein, "upper" or "top" refer to a direction away from the crankshaft such as toward top-dead-center, and "lower" or "bottom" refer to a direction toward the crankshaft such as toward bottom-dead-center.

Figure 3:
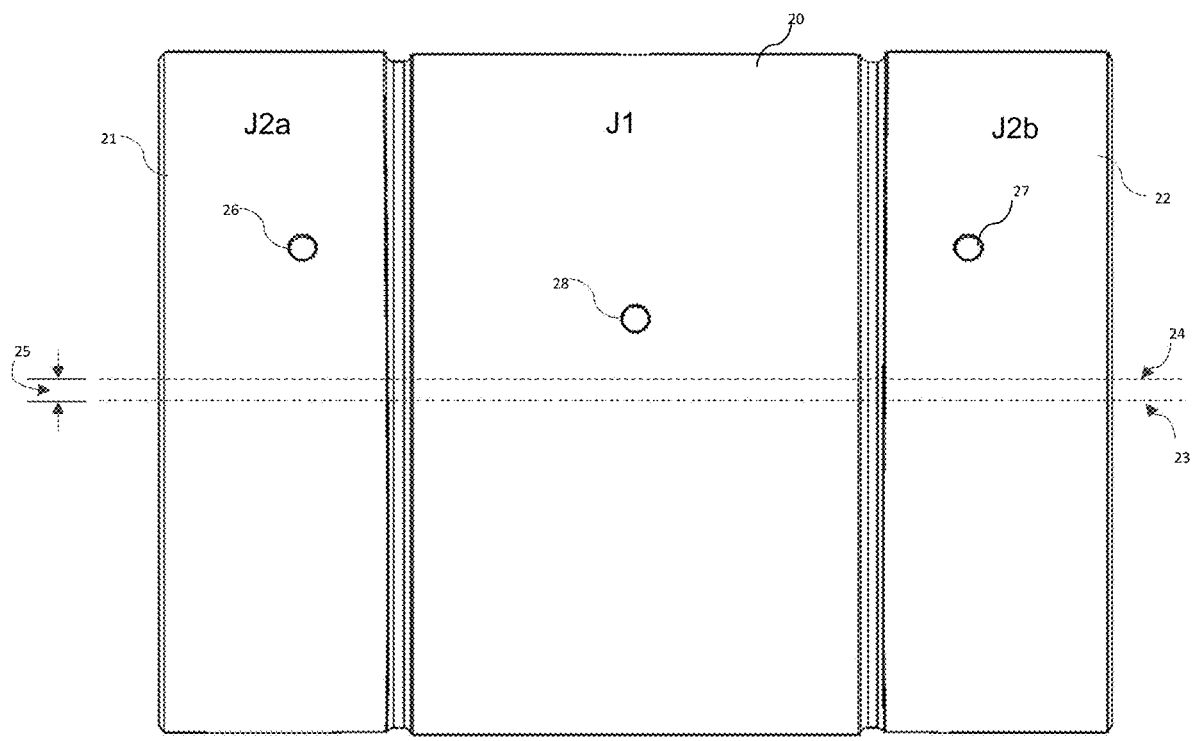
FIG. 3 is an elevation view illustrating bi-axial surfaces of the piston pin of FIG. 2.

FIG. 3 illustrates bi-axial surfaces of the piston pin 13 forming an outer surface of piston pin 13. In FIG. 3, a surface of the bearing zone 20 ("J1 surface") is concentric with axis 23. A surface of each of the bearing zones 21 and 22 ("J2a surface" and "J2b surface") is concentric with axis 24. The concentric axes 23 and 24 are offset by a small amount 25 to enable loading of the piston 11 to transition between the bearing surfaces as the connecting rod 14 articulates the piston pin 13 fore and aft due to rotation of a crankshaft (not shown).

The bearing shell 12 also has a mating bi-axial geometry. When the bearing surface J1 of bearing zone 20 is loaded, a mechanically created gap is formed between the bearing surfaces J2a and J2b of respective bearing zones 21, 22 and the bearing shell 12. Fluid such as oil is supplied to the bearing surfaces J2a and J2b of bearing zones 21 and 22 via oil supply holes 26 and 27, respectively. When the bearing surfaces J2a and J2b of respective bearing zones 21 and 22 are loaded, a mechanically created gap is formed between the bearing surface J1 of bearing zone 20 and the bearing shell 12, and oil is supplied to the bearing surface J1 of bearing zone 20 via oil supply hole 28. Without the mechanically created gaps between the piston pin 13 and the bearing shell 12, pressured oil would not flow into the highly loaded pin joint, which would cause scuffing or seizure.

In FIGS. 1-3, the bi-axial piston pin arrangement provides adequate lubrication to the pin joint in the piston 11 during engine operation. The principle behind this configuration is a three-bearing pin joint support. For example, an inner bearing zone 20 is flanked by two outer bearing zones 21, 22. The inner bearing zone 20 and the outer bearing zones 21, 22 utilize two different bearing axes 23, 24, hence the bi-axial arrangement. The piston pin 13 is engaged to an end of connecting rod 14 and articulates along with the connecting rod 14. This articulation causes the piston load to transition back and forth between the inner bearing zone 20 and the outer bearing zones 21, 22. As each bearing zone 22, 21, 22 transitions to an unloaded state, it is flooded with lubrication fluid before being loaded again. The mechanical unloading the pin joint provides for adequate lubrication.

The configuration of the piston assembly 10 in FIGS. 1-3 having a bi-axial bearing meets functional requirements for use in engine systems that employ a two-stroke and/or horizontally opposed piston engine configuration. Applications in other engine types and piston configurations are also contemplated for piston assembly 10.

In the embodiments of FIGS. 4-7, a piston pin 104 is disclosed that includes a cylindrical body having cross-section with a non-circular outer surface around the longitudinal axis of the piston pin 104. In certain embodiments, a piston pin bearing cage 106 is provided in the piston 102, which houses and connects to the non-circular piston pin 104, and the bearing cage 106 is connected to the piston 104 to indirectly couple the piston pin 104 to piston 102. In other embodiments, the piston pin 104 may be connected directly to the piston 104.

The non-circular piston pin 104 may be connected to a small end of a connecting rod 114 to create a "cam lobe" like effect at the pin joint of the piston pin 104 and connecting rod 114. For example, as the connecting rod 114 and piston pin 104 articulate within a cylinder bore 53 of the engine 50 (FIG. 14), the "cam lobe" like geometry lifts the piston 102 off the pin joint to allow oil to enter the joint for lubrication. As the piston 102 approaches the top and bottom of a cylinder stroke, the geometry provides for maximum load carrying capability.

According to the example embodiment of FIGS. 4-7, piston pin 104 for use in piston assembly 100 may be manufactured similar to a camshaft lobe and thus, may not include segmented bearing surfaces as shown for piston pin 13. The piston pin 104 may be housed within a separate bearing cage as shown in certain embodiments, or directly connected to the piston as shown in other embodiments. In certain embodiment, such as shown in FIGS. 4-7, the piston 102 does not have a pin bore opening on its outer sides and there are no holes to seal lubrication fluid from leaking out of the piston 102 into intake and exhaust ports.

Figure 4:
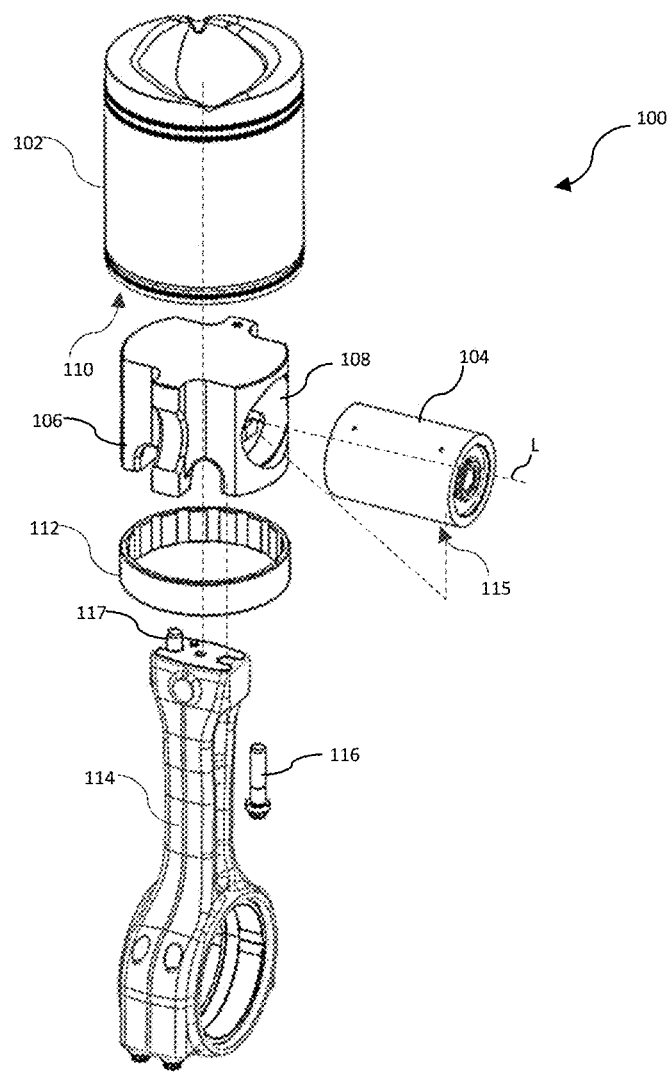
FIG. 4 is an exploded perspective view illustrating a piston assembly according to another embodiment of the present disclosure.

FIG. 4 illustrates piston assembly 100 according to an example embodiment. In FIG. 4, the piston assembly 100 includes a piston 102, a non-circular piston pin 104, and a piston pin bearing cage 106. The non-circular piston pin 104 may be inserted into a matching non-circular pin bearing bore 108 located in the piston pin bearing cage 106, or in a bore 108 formed directly in the piston 102. It shall be appreciated that the non-circular piston pin 104 and the piston pin bearing cage 106 is a sub-assembly configured to be loaded into a bottom portion 110 of the piston 102 and secured therein with a threaded locking ring 112.

The piston assembly 100 also includes a connecting rod 114, which may be assembled to a flat end portion or surface 115 on the bottom side of the non-circular piston pin 104 and secured thereto with cap screws 116 and 117. The non-circular piston pin 104 is configured to lift the piston 102 off the pin bore 108 as the connecting rod 114 articulates using a "camshaft lobe" like effect to be described in detail below. It shall be appreciated that when a piston pin bearing cage 106 is employed, the piston 102 no longer needs to include a pin bore feature for piston pin 102. In such embodiments, this closed piston skirt design therefore does not need pin bore plugs in the sides of the piston, and pin bore plugs and the potential for lubrication fluid leakage from piston 102 is eliminated.

Figure 5:
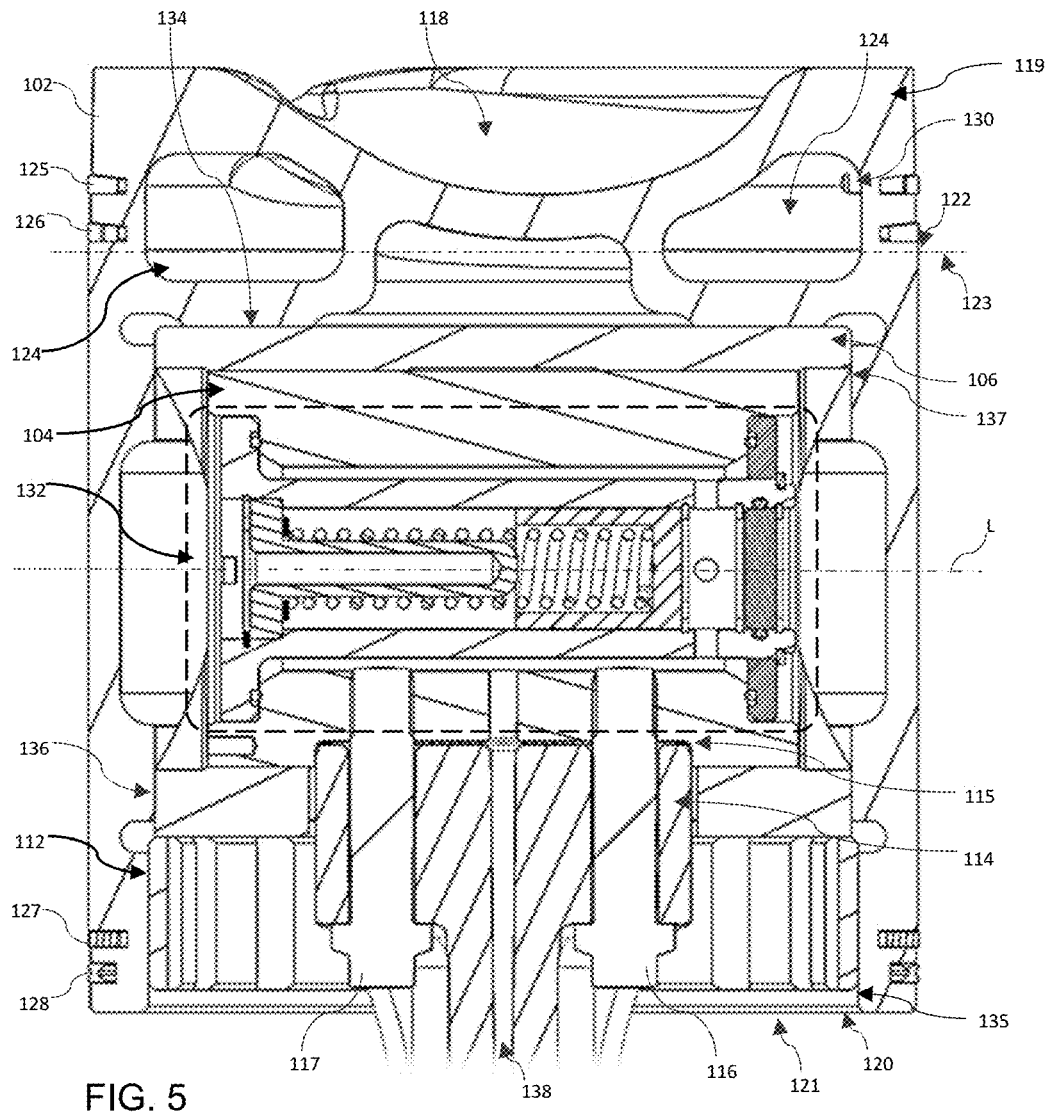
FIG. 5 is a cross-sectional view of a piston of the piston assembly in FIG. 4 along a longitudinal axis of a piston pin.

FIG. 5 illustrates a cross-sectional view of the piston 102 through a longitudinal axis L of the piston pin 104. In FIG. 5, the piston 102 may be configured with at least a first component and a second component. The first component of the piston 102 includes a piston bowl at crown 118 at an upper portion 119 of piston 104, and the second component of the piston 102 includes a piston skirt 120 at a lower portion 121. Piston skirt 120 extends around and contains piston pin 104. The first and second components may be joined together at joint 122 as illustrated along line 123 by welding, adhesion, interlocking features, etc. When the first and second components are joined together, a cooling gallery 124 may be formed below crown 118 to cool the piston 102 via fluid spray from a piston cooling nozzle (not shown).

The piston 102 includes piston rings 125, 126, 127, and 128, which may contain cylinder pressure and control oil on a cylinder wall (not shown). The top piston rings 125 and 126 travel over ports (not shown) located in the cylinder wall (not shown) and are held in place with a dowel 130 to ensure a ring gap location (not shown) is fixed and stays on a continuous section of the cylinder bore (not shown) instead of an interrupted area created by the port windows (not shown). The non-circular piston pin 104 may also be configured with an internal oil accumulator assembly 132.

The piston pin bearing cage 106 may have a depth in the piston 102 fixed by surface 134. The piston pin 104 can contact the piston bearing cage 106 at top 129 of the outer surface of piston pin 104, which can provide space for a thin film of lubricating fluid therebetween. The lower portion 121 of the piston 102 may be threaded with a large diameter internal thread 135 to allow the piston pin bearing cage 106 to be held in place by the threaded locking ring 112. In other example embodiments, a snap ring may be used to achieve a similar function of the threaded locking ring 112.

A side motion of the piston pin bearing cage 106 may be controlled at inner wall portions 136 and 137, which may share the same nominal diameter. The connecting rod 114 may be bolted to the flat end portion or surface 115 of the piston pin 104 via the cap screws 116 and 117. High pressure oil may be supplied to the piston pin 104 from an oil drilling portion or passage 138 provided in the connecting rod 114. In other example embodiments, a separate bearing or bushing may be used in between the piston pin 104 and the piston pin bearing cage 106, if desired. Yet in other example embodiments, diamond-like carbon coatings may also be used to further improve bearing performance.

Figure 6:
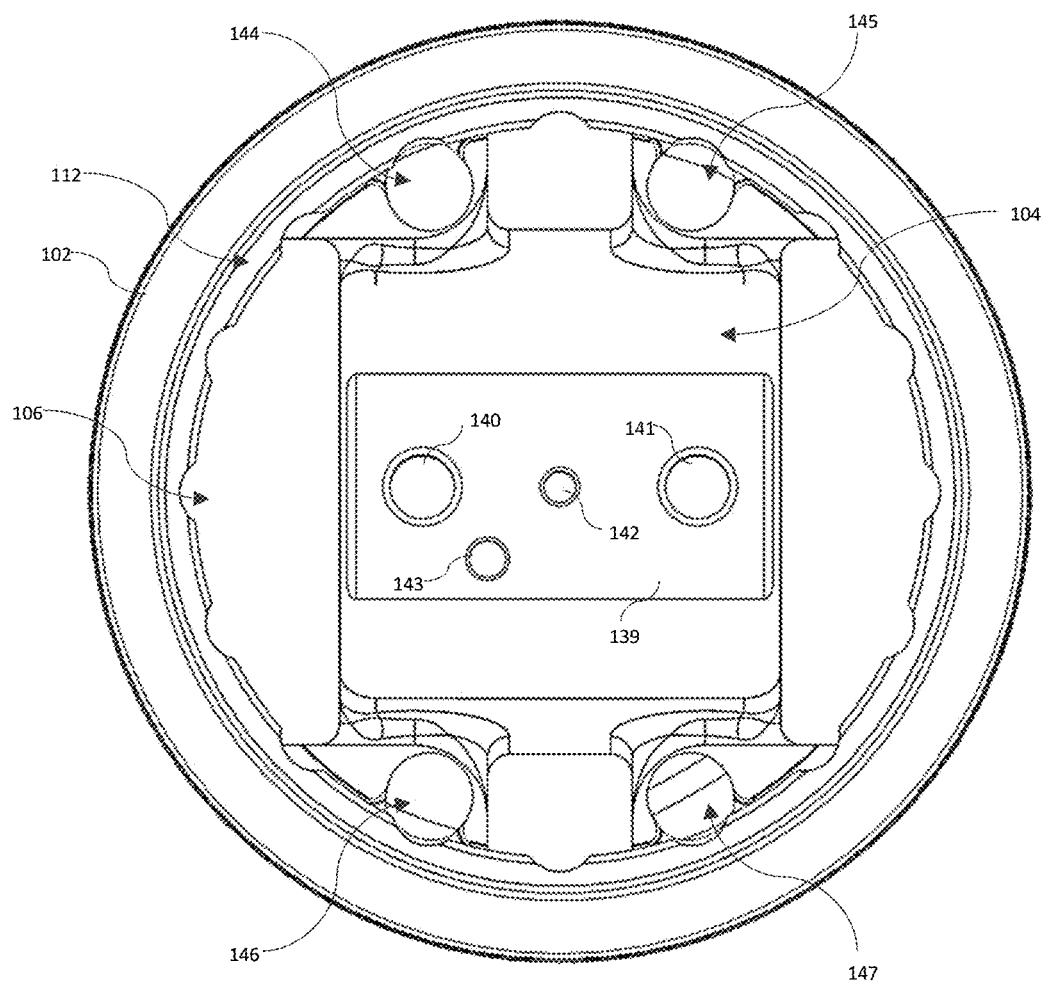
FIG. 6 is a bottom elevation view of the piston assembly of FIG. 4.

FIG. 6 illustrates a bottom view of the piston assembly 100. In FIG. 6, the piston pin 104 includes a rectangular connecting rod mounting pad 139 at flat end portion or surface 115 having threaded mounting holes 140 and 141 for receiving the connecting rod cap screws 116 and 117. The mounting pad 139 also includes a high-pressure oil supply inlet port 142 that is fed from the connecting passage 138, and a locating dowel location 143. Piston cooling nozzle interface ports 144, 145, 146, and 147 may be located on an underside of the piston 102. It shall be appreciated that the piston cooling nozzle interface ports 144, 145, 146, and 147 may be inlets or outlets for piston cooling nozzles (not shown) depending on which side of an engine the piston 102 is installed. Regardless of an orientation of the piston 102, the two inlets are located 180 degrees from one another. In other example embodiments, the piston 102 may also be configured with a single piston cooling nozzle utilizing one inlet and one outlet.

Figure 7:
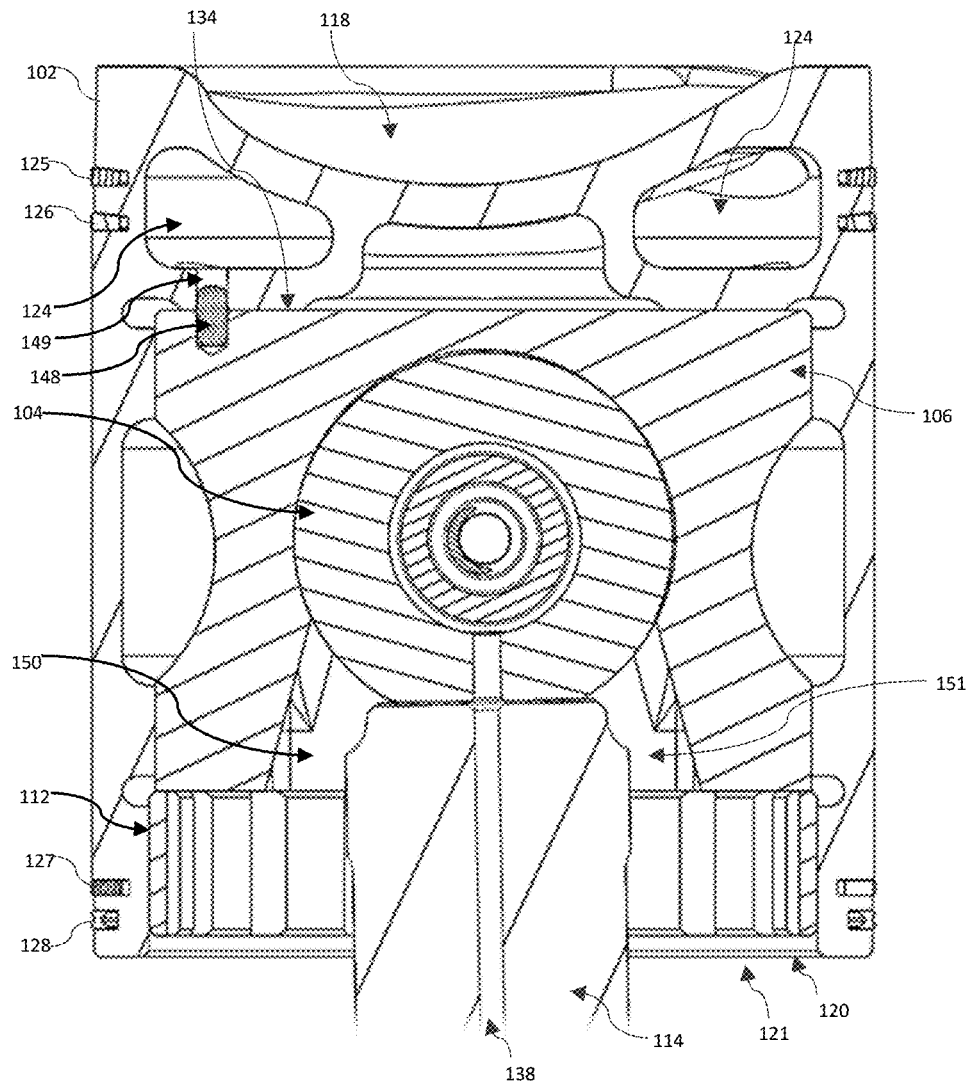
FIG. 7 is another cross-sectional view of the piston normal to the longitudinal axis of the piston pin of the piston assembly of FIG. 4.

FIG. 7 illustrates a cross-sectional view of the piston 102 orthogonally to longitudinal axis L of the piston pin 104. In FIG. 7, the piston assembly 100 may include a locating dowel 148 provided in the bearing cage 106 and a mating dowel hole 149 provided in the piston 102. The locating dowel 148 and the mating dowel hole 149 may be configured to fix a rotational orientation of the bearing cage 106 relative to the piston 102. In other example embodiments, configurations utilizing keyways, notches, or flats may be used to fix the rotational orientation of the bearing cage 106. The bearing cage 106 may also include clearance regions 150 and 151 to allow the connecting rod 114 to articulate with motion of the crankshaft.

Figure 8:
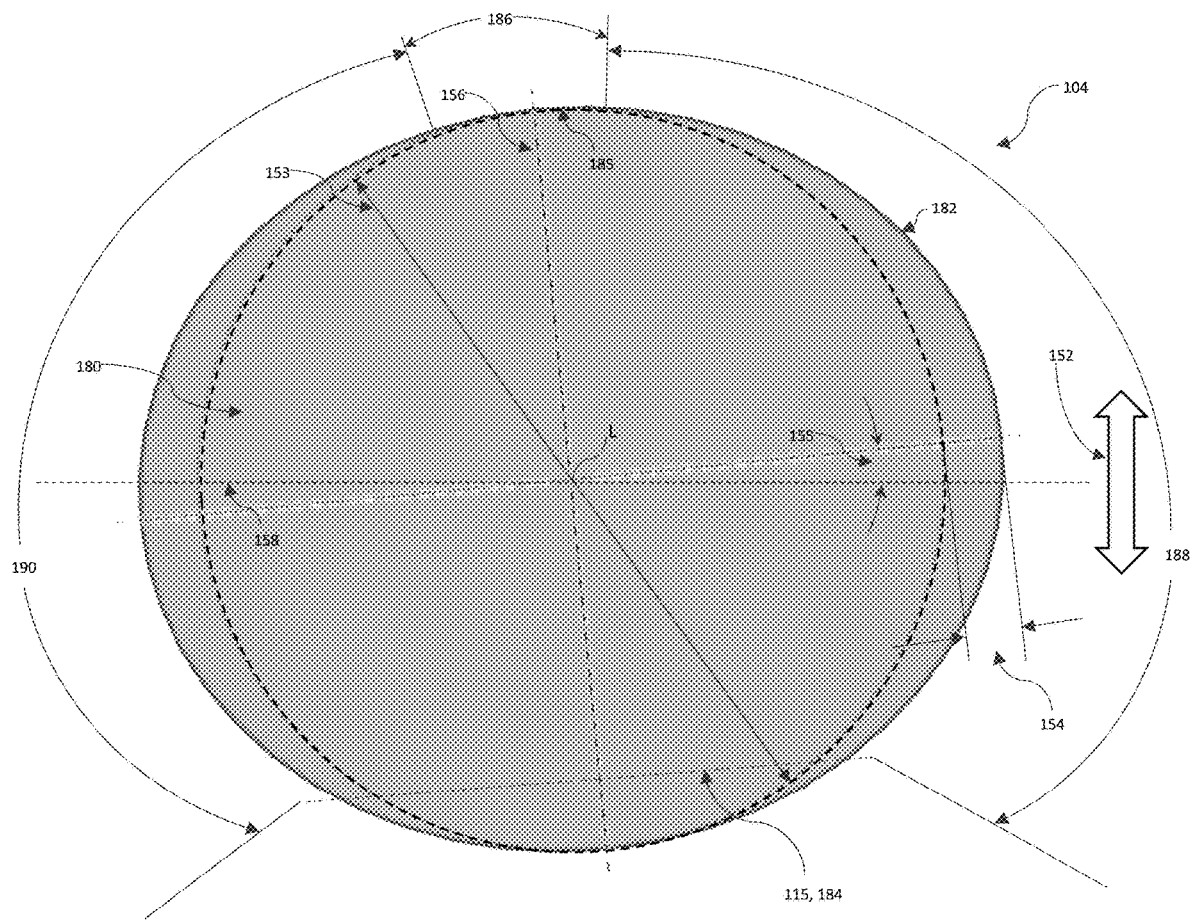
FIG. 8 is a schematic diagram illustrating a cross-sectional view of the piston pin of the piston assembly of FIG. 4.

FIG. 8 illustrates a cross-sectional view of the piston pin 104 orthogonal to longitudinal axis L. The cross-sectional view in FIG. 8 is exaggerated herein for clarity, and the flat end portion or surface 115 forming mounting pad 139 is shown as a first surface 184 on a bottom side of piston pin 104. In FIG. 8, the motion of the piston 102 in the cylinder bore 52 (FIG. 14) is denoted by arrow 152.

Piston pin 104 includes a cylinder body 180 having an outer surface 182. Body 180 extends along longitudinal axis L in a transverse orientation to connecting rod 114. Outer surface 182 extends along longitudinal axis L in the longitudinal direction and around longitudinal axis L in the section view of FIG. 8. Outer surface 182 extends around longitudinal axis L from one side of first surface 184 on a bottom side of body 180 to the opposite side of first surface 184 on the bottom side of body 180. Outer surface 182 has a non-circular shape around longitudinal axis L.

Top surface 185 extends along a first portion 186 of the outer surface 182 of the piston pin 104 that is opposite first surface 184. A baseline circular shape of top surface 185 along first portion 186 is formed by a circular diameter 153. First portion 186 can be centered on a vertical axis 156 that is orthogonal to longitudinal axis L. Horizontal axis 158 is orthogonal to vertical axis 192 and longitudinal axis L.

Outer surface 182 includes a second portion 188 and a third portion 190 that extend between first portion 186 and first surface 184 on opposite sides of body 180. Second portion 188 and third portion 190 each form an additional lobe-like geometry. In an embodiment, the lobe-like geometry is defined by an elliptical offset of a defined magnitude 154 projecting outwardly from the circular shape defined by diameter 153. Second and third portions 188, 190 can also be offset vertically from horizontal axis 158 by an angular orientation 155.

While the cross-sectional view in FIG. 8 is shown with second and third portions 188, 190 symmetric about vertical axis 156, it may be asymmetric, if desired. Likewise, while the shapes of second and third portions 188, 190 are based on an elliptical profile, it may be configured using any number of non-circular geometries. Further, the piston 104 may be configured with a profiled, or non-straight, geometry along an axis thereof depending on the desired bearing performance. It shall be appreciated that the geometry of the piston pin 104 may be configured by similar construction used to manufacture camshaft lobes.

First portion 186 of outer surface 182 extends between and connects second portion 188 and third portion 190. First surface 184 extends from second portion 186 to third portion 188. In an embodiment, the second portion 186 and/or third portion 188 form a lobe between first surface 184 and the second, top surface 185.

Figure 9:
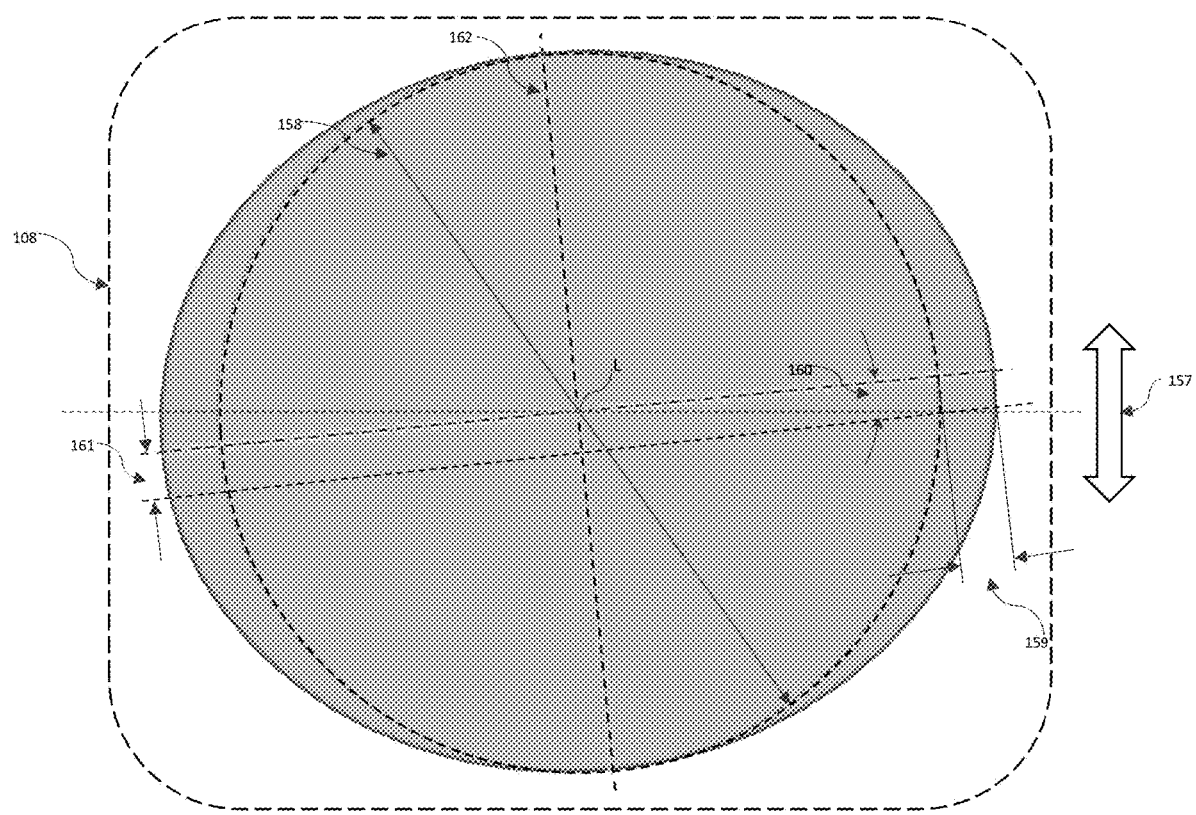
FIG. 9 is a schematic diagram illustrating a cross-sectional view of a piston pin bearing cage pin bore and piston pin of the piston assembly of FIG. 4.

FIG. 9 illustrates a cross-sectional view of the piston pin bore 108 that receives the piston pin 104, either in a cage 106 or directly in the piston 102. The cross-sectional view in FIG. 9 is exaggerated herein for clarity. In FIG. 9, the motion of the piston 102 is denoted by arrow 157. A circular diameter 153 is the baseline shape with an additional lobe-like geometry defined by an elliptical offset of a defined magnitude 159 and an angular orientation 160. An additional offset 161 may be used to make sure the mating non-circular piston pin 104 has adequate clearance in the piston pin bore 108 while it articulates. While the cross-sectional view in FIG. 8 is shown to be symmetric about axis 162, it may be asymmetric, if desired. Likewise, while this view is based on an elliptical profile, it may be configured using any number of non-circular geometries. Further, the piston pin bore 108 may be configured with a profiled or non-straight geometry along an axis thereof depending on the desired bearing performance.

Figure 14:
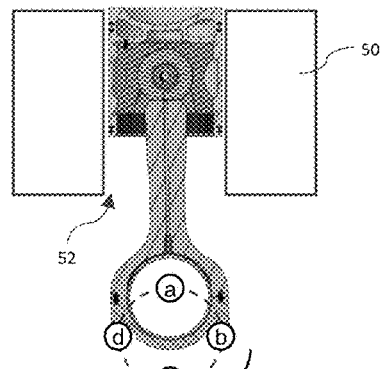
FIG. 14 is a schematic diagram illustrating the crankshaft positions corresponding to the piston locations of FIGS. 10-13.

FIGS. 10-13 are schematic diagrams illustrating cross-sectional views of a resultant motion of the piston 102 based on articulation of the piston pin 104 in the bore 108 of piston 102. FIG. 14 shows internal combustion engine 50 having a cylinder bore 52 for receiving piston 102. The cross-sectional views of FIGS. 10-13 are exaggerated herein for clarity. Motion of the piston assembly 100 shown in FIGS. 10, 11, 12, and 13 in power cylinder positions in the cylinder bore 52 during normal engine operation is shown in four different zones denoted by (a), (b), (c), and (d), respectively, in FIG. 14 during a 360 degree rotation of the crankshaft.

Figures 10, 11, 12, 13:
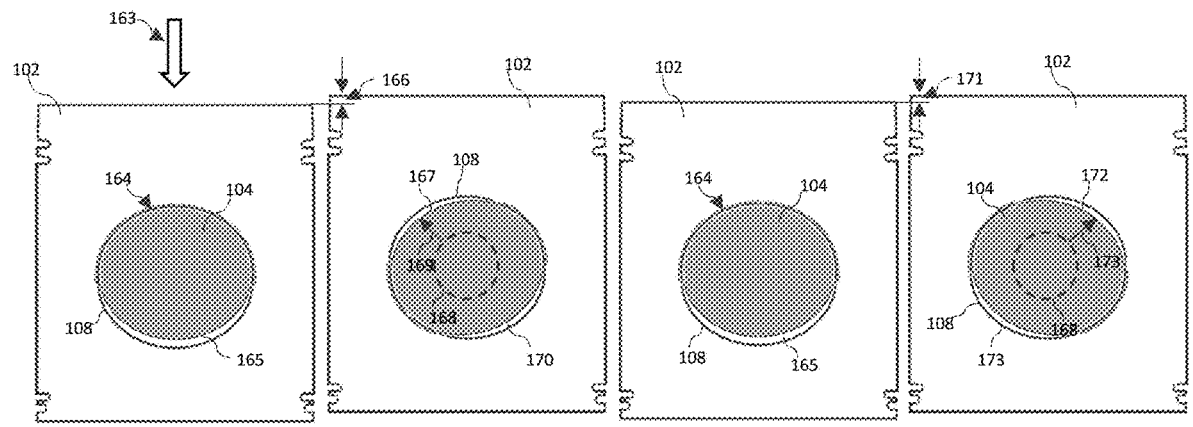
FIGS. 10-13 are schematic diagrams illustrating various stages of a resultant motion of the piston based on articulation of the piston pin of the piston assembly of FIG. 4.

At position (a) of FIG. 14 shown in FIG. 10, a pressure direction of the piston assembly 100 is denoted by arrow 163. It shall be appreciated that the pressure direction is the same for all power cylinder positions during normal operation. The piston pin 104 and the mating piston pin bore 108 is oriented for maximum bearing capability as a combustion event occurs and forces the piston 102 downward. The only separation between the piston pin 104 and the mating piston pin bore 108 at location 164 is made possible by oil film established in a joint therebetween the piston pin 104 and the mating piston pin bore 108 during a previous motion of the piston 102 leading up to position (a). A gap 165 is present to allow for movement of the piston 102 that is needed for the upcoming power cylinder positions.

From position (a), the piston assembly 100 transitions to position (b) as shown in FIG. 11 where the articulation of the connecting rod 114 causes the piston pin 104 to lift the piston 102 upward by a value denoted by 166 since the piston 102 is constrained to only travel up and down in the cylinder bore. A gap 167 is created in a top portion of the piston pin bore 108 to supply fluid such as lube oil via a central piston oil gallery 168 through a targeted drilling 169. Likewise, a gap 170 in a lower portion of the piston pin bore 108 is reduced.

From position (b), the piston assembly 100 transitions to position (c) as shown in FIG. 12. In FIG. 12 the relative positioning between piston 102 and piston pin 104 is the same as position (a).

From position (c), the piston assembly 100 transitions to position (d) as shown in FIG. 13. In FIG. 13 the articulation of the connecting rod 114 has caused the piston pin 104 to lift the piston 102 upward by a value denoted by 171 since the piston 102 is constrained to only travel up and down in the cylinder bore. A gap 172 is created in the top portion of the piston pin bore 108 to supply fluid via the central piston oil gallery 168 through a targeted drilling 169. A gap 173 in the lower portion of the piston pin bore 108 is thereby reduced.

It shall be appreciated that if the piston pin 104 geometry is symmetric, the relative positioning between piston 102 and piston pin 104 near positions (b) and (d) will be mirror images of one another. If an asymmetric geometry piston pin 104 is used, different orientations may be established at positions (b) and (d) and may be beneficial to bearing performance.

Figure 15:
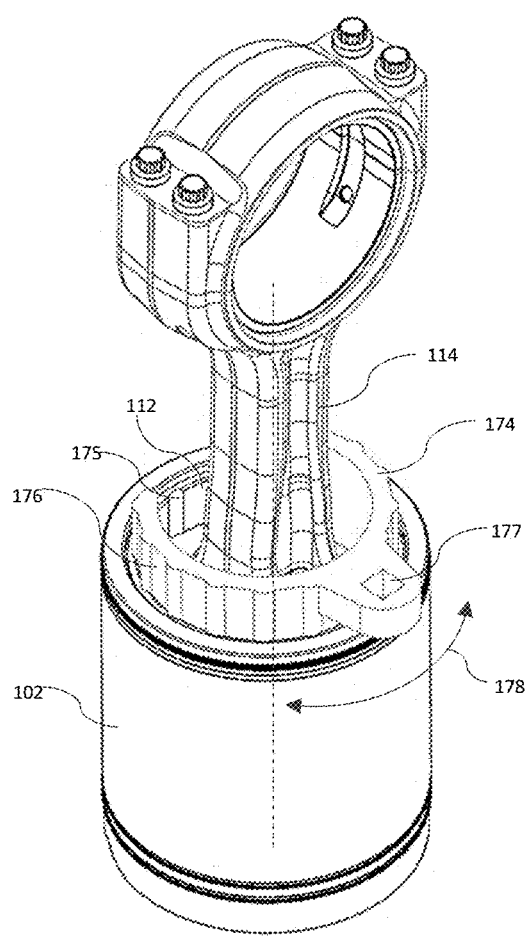
FIG. 15 is a perspective view illustrating an exemplary locking ring tool for installing the rocking ring.

FIG. 15 illustrates a locking ring tool 174 to secure the locking ring 112 against the piston pin bearing cage 106 inside the piston 102. In FIG. 15, an internal groove feature 175 provided in the locking ring 112 may be configured to engage into a corresponding external groove feature 176 provided in the locking ring tool 174 to permit torque transfer. In the example embodiment, a square drive feature 177 may be configured to engage a suitable torque measurement device (not shown) to the locking ring tool 174 to either tighten or loosen the locking ring 112 in a rotational direction as denoted by arrow 178. Although an internal and external groove feature is shown in FIG. 15, it shall be appreciated that any number of methods may be used to apply torque to the locking ring 112 during installation or removal.

Figure 16:
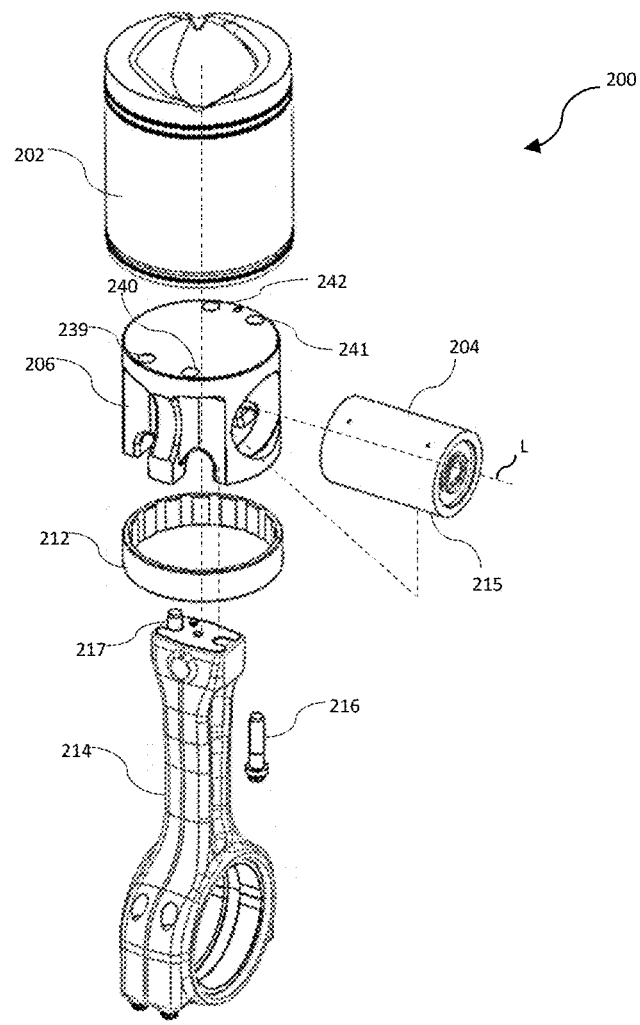
FIG. 16 is an exploded perspective view illustrating a piston assembly according to another embodiment of the present disclosure.

FIG. 16 illustrates a piston assembly 200 according to another example embodiment. In FIG. 16, the piston assembly 200 includes a piston 202, a non-circular piston pin 204, and a piston pin bearing cage 206. Piston pin 204 can be configured like piston pin 104 discussed above. In addition, embodiments without bearing cage 206 are contemplated in which non-circular piston pin 204 is engaged directly to piston 202.

The non-circular piston pin 204 may be inserted into a matching non-circular pin bore 208 located in the piston pin bearing cage 206, or in a bore 208 in the piston 202. It shall be appreciated that the non-circular piston pin 204 and the piston pin bearing cage 206 is a sub-assembly configured to be loaded into a bottom portion 210 of the piston 202 and secured therein with a threaded locking ring 212. The piston assembly 200 also includes a connecting rod 214, which may be assembled to a flat end portion 215 on the non-circular piston pin 204 and secured thereto with cap screws 216 and 217.

Figure 17:
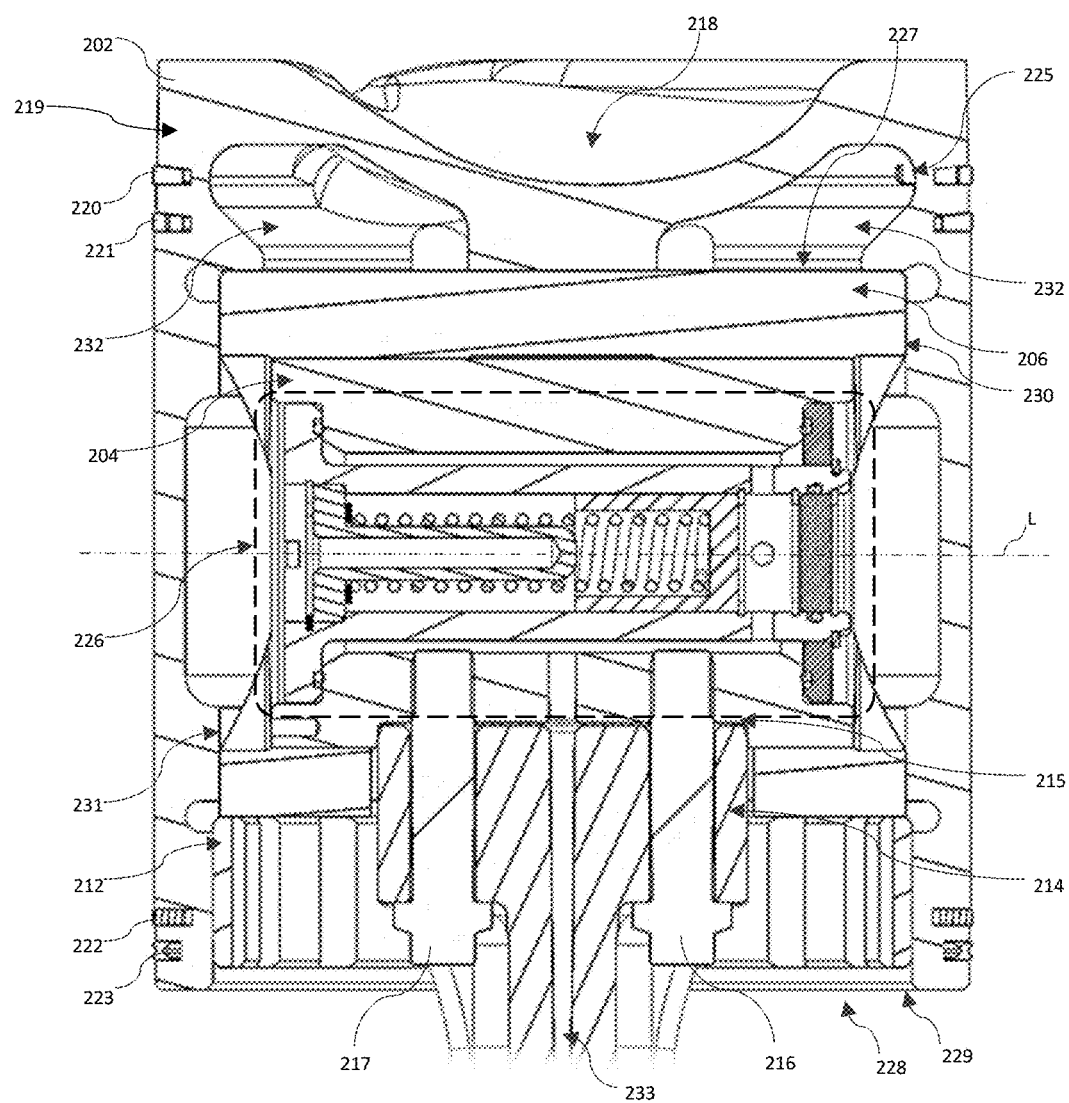
FIG. 17 is a cross-sectional view of a piston of the piston assembly in FIG. 16 along a longuitudinal axis of a piston pin.

FIG. 17 illustrates a cross-sectional view of the piston 202 through longitudinal axis L of the piston pin 204. In FIG. 17, the piston 202 may be configured as one component including an upper portion with a piston crown 218 including a bowl, and a lower portion with a closed piston skirt 219. The piston 202 includes piston rings 220, 221, 222, and 223, which may contain cylinder pressure and control oil on a cylinder wall (not shown). The top piston rings 220 and 221 travel over ports (not shown) located in the cylinder wall (not shown) and are held in place with a dowel 225 to ensure a ring gap location (not shown) is fixed and stays on a continuous section of the cylinder bore (not shown) instead of an interrupted area created by the port windows (not shown). The non-circular piston pin 204 may also be configured with an internal oil accumulator assembly 226.

The piston pin bearing cage 206 may have a depth in the piston 202 fixed by surface 227. A lower portion 228 of the piston 202 may be threaded with a large diameter internal thread 229 to allow the piston pin bearing cage 206 to be held in place by the threaded locking ring 212. In other example embodiments, a snap ring may be used to achieve a similar function of the threaded locking ring 212.

A side motion of the piston pin bearing cage 206 may be controlled at inner wall portions 230 and 231, which may share the same nominal diameter. When the piston pin bearing cage 206 is assembled to the piston 202, an annular closed oil gallery 232 may be formed to cool the piston 202 via oil spray from a piston cooling nozzle (not shown). The connecting rod 214 may be bolted to a flat end portion 215 of the piston pin 204 via the cap screws 216 and 217. High pressure oil may be supplied to the piston pin 204 from an oil drilling portion or passage 233 provided in the connecting rod 214. In other example embodiments, a separate bearing or bushing may be used in between the piston pin 204 and the piston pin bearing cage 206, if desired. Yet in other example embodiments, diamond-like carbon coatings (DLC) may also be used to further improve bearing performance.

Figure 18:
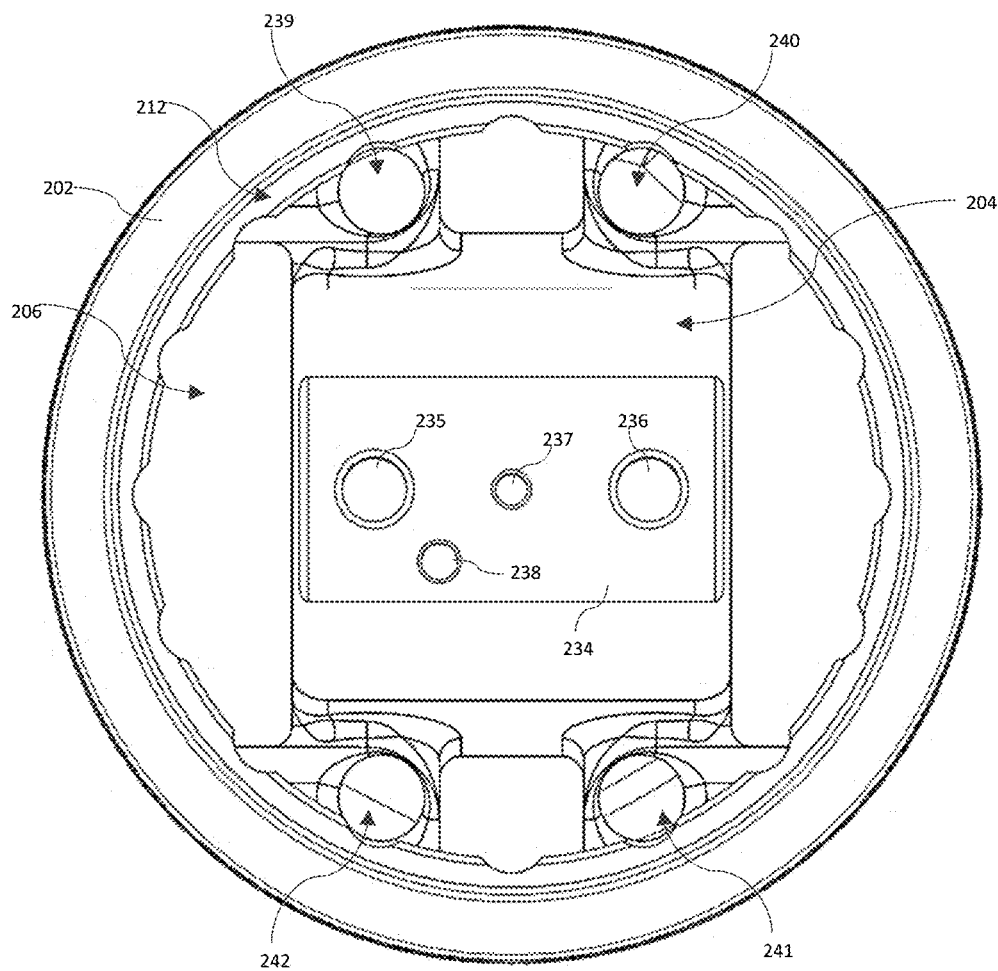
FIG. 18 is a bottom elevation view of the piston assembly of FIG. 16.

FIG. 18 illustrates a bottom view of the piston assembly 200. In FIG. 14, the piston pin 204 includes a rectangular connecting rod mounting pad 234 having threaded mounting holes 235 and 236 for receiving the connecting rod cap screws 216 and 217. The mounting pad 234 also includes a high-pressure oil supply inlet port 237 that is fed from the connecting rod drilling portion 233, and a locating dowel location 238. Piston cooling nozzle interface ports 239, 240, 241, and 242 may be located in the piston pin bearing cage 206. It shall be appreciated that the piston cooling nozzle interface ports 239, 240, 241, and 242 may be inlets or outlets for the piston cooling nozzles (not shown) depending on which side of the engine the piston 202 is installed. Regardless of an orientation of the piston 202, the two inlets are located 180 degrees from one another. In other example embodiments, the piston pin bearing cage 206 may also be configured with a single piston cooling nozzle utilizing one inlet and one outlet.

Figure 19:
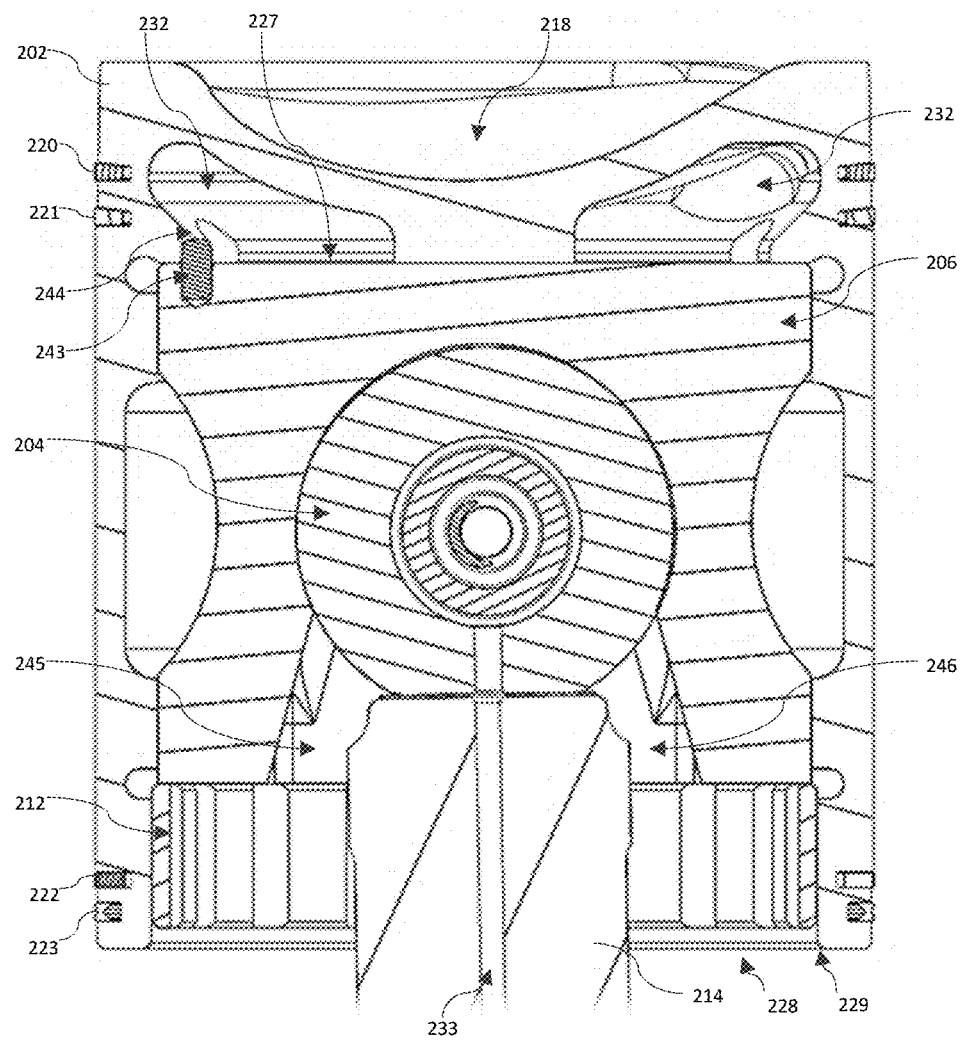
FIG. 19 is another cross-sectional view of the piston normal to the longitudinal axis of the piston pin of the piston assembly of FIG. 16.

FIG. 19 illustrates a cross-sectional view of the piston 202 through an axis of the piston pin 204. In FIG. 19, the piston assembly 200 may include a locating dowel 243 provided in the bearing cage 206 and a mating dowel hole 244 provided in the piston 202. The locating dowel 243 and the mating dowel hole 244 may be configured to fix a rotational orientation of the bearing cage 206 relative to the piston 202. In other example embodiments, configurations utilizing keyways, notches, or flats may be used to fix the rotational orientation of the bearing cage 206. The bearing cage 206 may also include clearance regions 245 and 246 to allow the connecting rod 214 to articulate with motion of the crankshaft.

Figure 20:
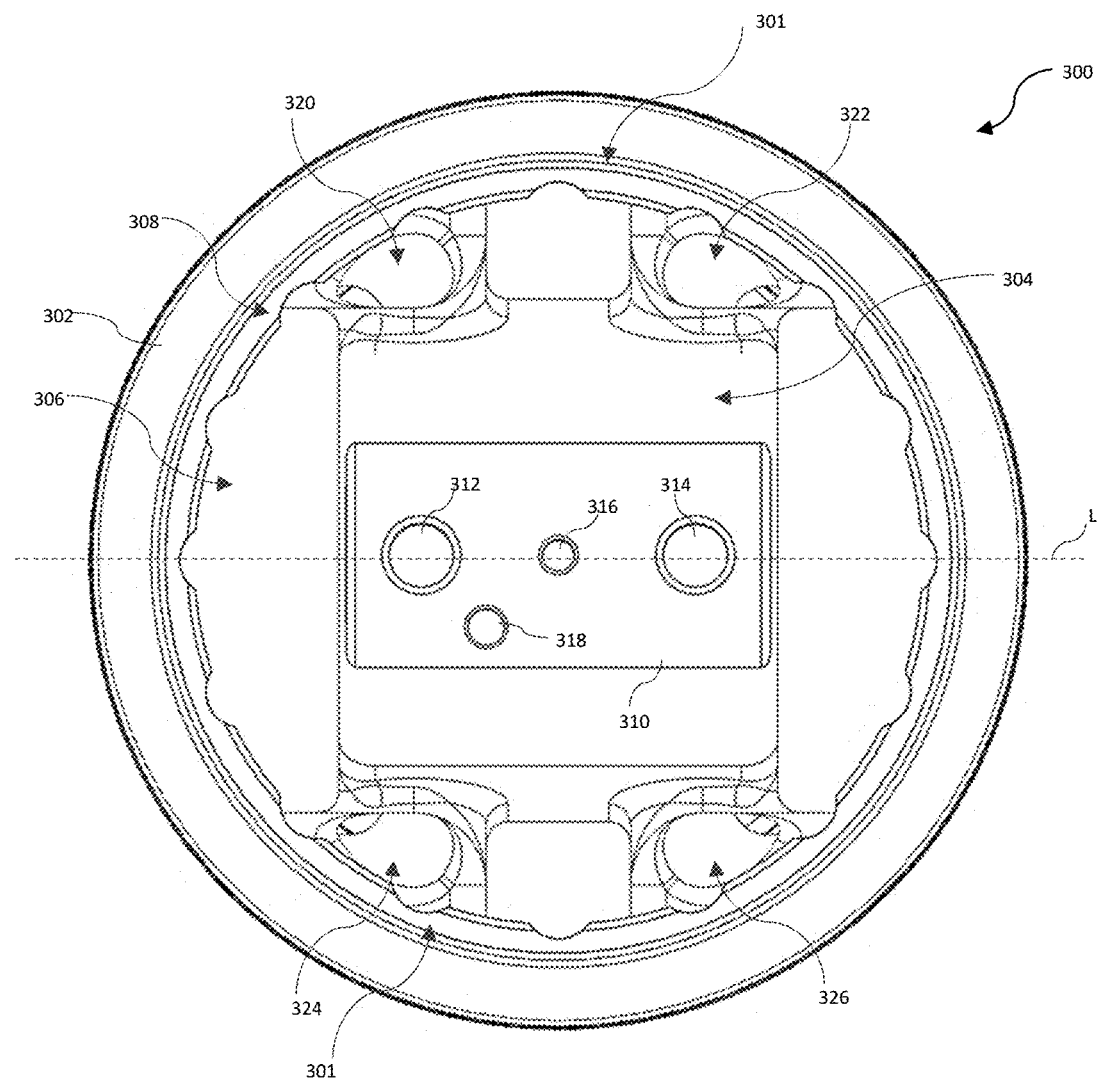
FIG. 20 is a bottom elevation view of a piston assembly according to another embodiment of the present disclosure.

FIG. 20 illustrates a bottom view of a piston assembly 300 according to another example embodiment that includes a piston cooling arrangement 301. In FIG. 20, the piston assembly 300 includes a piston 302, a non-circular piston pin 304, and a piston pin bearing cage 306. It shall be appreciated that the non-circular piston pin 304 and the piston pin bearing cage 306 is a sub-assembly configured to be loaded into the piston 302 and secured therein with a threaded locking ring 308. The piston pin 304 includes a rectangular connecting rod mounting pad 310 having threaded mounting holes 312 and 314 for receiving connecting rod cap screws (not shown). The mounting pad 310 also includes a high-pressure oil supply inlet port 316 that is fed from the connecting rod drilling portion (not shown), and a locating dowel location 318.

In the example embodiment, the piston cooling arrangement 301 may include angled piston cooling nozzle interface inlet ports 320, 324 and outlet ports 322, 326 that divert cooling fluid flow from a first trajectory to a second trajectory. It shall be appreciated that the piston cooling nozzle outlet ports 322, 326 could be configured as inlet ports for the piston cooling nozzles and inlet ports 320, 324 configured as outlet ports for the cooling fluid, depending on which side of the engine the piston 302 is installed. Regardless of an orientation of the piston 302, the two inlet ports 320, 324 are located 180 degrees from one another. In other example embodiments, the piston pin bearing cage 306 may also be configured with a single piston cooling nozzle interface utilizing one inlet and one outlet.

The angled orientation of the piston cooling nozzle inlet ports 320, 324 allows for the piston cooling nozzle fluid flow to be diverted to a more desirable impingement location 328, 329 (as described below in FIG. 21) on the bottom side of crown 319 of the piston 302. In this case, the more desirable location may be located above the piston pin 304 and cannot be accessed with a direct line of sight spray path using non-angled ports. In an embodiment, one or more of the impingement locations 328, 329 is directly above the piston pin 304. In an embodiment, one or more of the impingement locations 328, 329 is directly above the longitudinal axis L of piston pin 304.

Since the piston pin bearing cage 306 is a separate component, it may be easier to integrate angled inlet ports 320, 324 into piston bearing cage 306 to adjust the trajectory of the piston cooling nozzle fluid flow in a separate bearing cage. However, angled inlet ports 320, 324 could also be integrated into the body of piston 302 to direct fluid flowing into the piston 302 from a first trajectory to a second trajectory.

Figure 21:
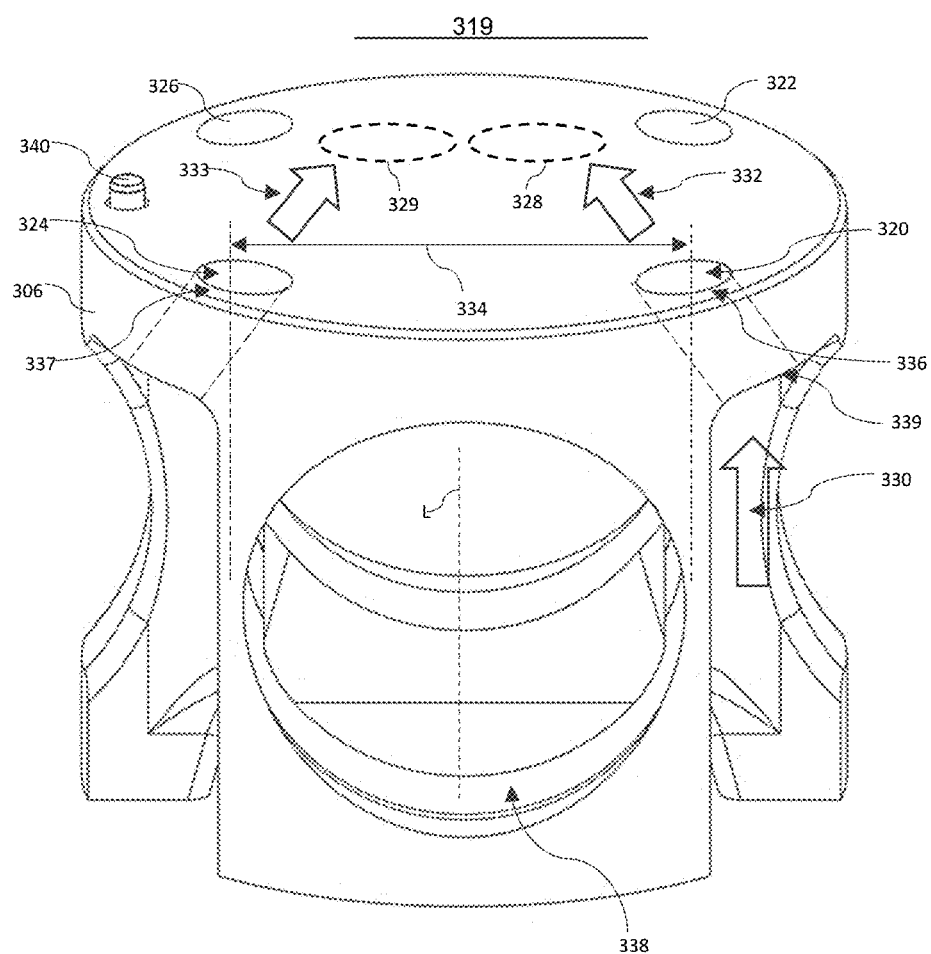
FIG. 21 is a schematic diagram illustrating an isometric view of a piston pin bearing cage of the piston assembly in FIG. 20.

FIG. 21 illustrates an isometric view of the piston pin bearing cage 306. In FIG. 21, the angled piston cooling nozzle inlet ports 320, 324 are located in the top of the piston pin bearing cage 306. Inlet ports 320, 324 could also be located in the body of piston 302. In other example embodiments, the piston pin bearing cage 306 and/or piston 302 may also be configured with a single piston cooling nozzle interface utilizing one inlet and one outlet.

The angled orientation of the inlet ports 320, 324 allows for piston cooling nozzle fluid flow that is initially provided along an outer perimeter of the piston 302 outside of the piston pin bore 338 (as denoted by arrow 330) to be diverted (as denoted by arrows 332, 333) to more desirable impingement locations 328, 329 on the bottom side of a piston crown 319. As cooling fluid passes through the inlet ports 320, 324, the inlet ports 320, 324 are configured to form a trajectory 332, 333 for the fluid flow that is obliquely oriented to a direction of movement of the piston 302 in the cylinder bore. The angular orientation of inlet ports 320, 324 directs the fluid from a location at or adjacent a perimeter of the piston 302 toward a more medial or centrally directed location. The centrally directed location may include an impingement point at a location above the piston pin 304 in region 334. In the example embodiment, by utilizing angled inlet ports 320, 324, the fluid flow may be redirected from an inlet outside piston bore 338, such as inlet 339, to an exit location 336, 337 inboard and above the piston pin bore 338 and below the center of crown 319 of piston 302.

Further written description of a number of example embodiments shall now be provided. One embodiment is a piston assembly for an internal combustion engine. The piston assembly includes a piston provided in an engine cylinder having a cylinder bore, a piston pin coupled to a connecting rod configured to reciprocally move the piston in the cylinder bore, and a piston pin bearing cage. The piston pin bearing cage has a pin bore configured to receive the piston pin. The piston pin is provided in the pin bore, and the piston pin bearing cage is housed in the piston.

In certain forms of the foregoing piston assembly, the piston assembly further includes a locking ring to secure the piston pin bearing cage within the piston. In certain forms, the piston pin is non-circular and configured with at least one flat end surface coupled to the connecting rod. In certain forms, the piston pin is configured to lift the piston off the pin bore of the piston pin bearing cage in correspondence with movement of the connecting rod. In certain forms, the connecting rod includes an oil drilling inlet to supply oil to the piston pin. In certain forms, the piston assembly further includes at least one piston cooling nozzle interface port on an underside of the piston. In certain forms, the piston includes a piston body having an upper portion and a lower portion, the upper portion including a piston bowl and the lower portion including a piston skirt. In certain forms, the upper portion and the lower portion combine to form a piston cooling oil gallery. In certain forms, the lower portion includes the piston pin bearing cage.

Another embodiment is a piston assembly for an internal combustion engine including a piston provided in an engine cylinder having a cylinder bore. The piston includes a crown in an upper portion of the piston, a piston pin coupled to a connecting rod configured to reciprocally move the piston in the cylinder bore, and a piston pin bearing cage configured to house the piston pin and couple to the upper portion of the piston to form a piston cooling oil gallery.

In certain forms, the piston pin bearing cage includes a pin bore to house the piston pin. In certain forms, the piston assembly further includes a locking ring to secure the piston pin bearing cage within the piston. In certain forms, the piston pin is non-circular and configured with at least one flat end surface coupled to the connecting rod. In certain forms, the piston pin is configured to lift the piston off the pin bore of the piston pin bearing cage in correspondence with movement of the connecting rod. In certain forms, the connecting rod includes an oil drilling inlet to supply oil to the piston pin. In certain forms, the piston assembly further includes at least one piston cooling nozzle interface port on an underside of the piston.

Yet another embodiment is a piston cooling arrangement for an internal combustion engine including a piston provided in an engine cylinder having a cylinder bore and configured to move reciprocally in the cylinder bore. The piston includes a piston oil cooling gallery having at least one inlet and one outlet. The at least one inlet port is configured to divert oil flowing to the piston oil cooling gallery from a first trajectory to a second trajectory.

Another embodiment is a power cylinder assembly for an internal combustion engine including a cylinder having a cylinder bore. A piston assembly is provided in the cylinder bore along with a connecting rod. The piston assembly includes a piston, a piston pin coupled to the connecting rod configured to move reciprocally the piston in the cylinder bore, and a piston pin bearing cage. The piston pin bearing cage has a pin bore configured to receive the piston pin, and the piston pin is provided in the pin bore. The piston pin bearing cage is housed in the piston.

Another embodiment is a piston assembly for an internal combustion engine that includes a piston pin for coupling to a connecting rod to a piston, the piston pin including a non-circular outer surface geometry. Another embodiment is a piston assembly for an internal combustion engine that includes a piston pin bearing cage for housing a piston pin and a locking ring to secure the piston pin bearing cage in a piston.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A piston pin for coupling a connecting rod to a piston, the piston pin comprising:
    a cylindrical piston pin body including a first surface configured to be engaged to an end of the connecting rod with the piston pin body positioned within the piston to couple the connecting rod to the piston, the piston pin body extending along a longitudinal axis that is transverse to the connecting rod, the piston pin body further including an outer surface extending around the longitudinal axis from the first surface, the outer surface having a non-circular shape around the longitudinal axis from one side of the first surface to an opposite side of the first surface, the opposite sides of the first surface and the non-circular shape extending a length of the piston pin body along the longitudinal axis.

2. The piston pin of claim 1, wherein the outer surface includes:
    a first portion opposite the first surface, the first portion of the outer surface extending along an arc defined by a diameter extending through a center of the piston pin body; and
    a second portion forming a non-circular shaped portion of the outer surface around the longitudinal axis that connects the first portion to the one side of the first surface.

3. The piston pin of claim 2, wherein the outer surface includes:
    a third portion opposite the second portion, the third portion forming a non-circular shaped portion of the outer surface around the longitudinal axis that connects the first portion to the opposite side of the first surface.

4. The piston pin of claim 3, wherein each of the first portion and the first surface connects the second portion and the third portion on opposite sides of the piston pin body, and the first surface is a flat surface.

5. The piston pin of claim 3, wherein:
    the piston pin body includes a vertical axis extending through the center of the piston body;
    the first portion is centered on the vertical axis;
    the piston pin body includes a horizontal axis orthogonal to the longitudinal axis and the vertical axis; and
    the second portion and the third portion are elliptical in shape and offset vertically from the horizontal axis by an angular orientation.

6. The piston pin of claim 1, wherein the outer surface of the piston pin body includes:
    a second surface opposite the first surface and the-non-circular shape of the outer surface forms at least one lobe located between first surface and the second surface; and
    the first surface is a flat surface extending along the longitudinal axis and the flat surface includes at least one hole for receiving a fastener to engage the piston pin body to the end of the connecting rod.

7. A piston assembly for an internal combustion engine, the piston assembly comprising:
    a piston that is movable along a cylinder bore of the internal combustion engine, the piston including an upper portion and a lower portion, the upper portion of the piston including a crown facing the cylinder bore; and
    a piston pin extending along a longitudinal axis transversely to the piston, the piston pin being coupled to the piston below the crown, wherein the piston pin includes an outer surface extending around the longitudinal axis and a flat surface with opposite sides extending a length of the piston pin along the longitudinal axis, the outer surface having a non-circular shape from one side of the flat surface and from an opposite side of the flat surface to a first portion of the outer surface opposite the flat surface so that gaps for receiving fluid are created between the piston pin and the upper portion of the piston in response to the piston moving along the cylinder bore.

8. The piston assembly of claim 7, further comprising a bearing cage in the piston, the piston pin being engaged to the bearing cage, and the bearing cage is coupled to the piston to form a cooling gallery below the crown.

9. The piston assembly of claim 8, wherein the bearing cage includes a pin bore, and the piston pin is housed in the pin bore.

10. The piston assembly of claim 7, wherein:
    the piston pin includes a vertical axis that intersects the longitudinal axis and a horizontal axis orthogonal to the longitudinal axis and the vertical axis;
    the first portion of the outer surface is centered on the longitudinal axis, the first portion lying on a circle having a diameter extending through the center; and
    the outer surface includes a second portion and a third portion opposite the second portion, the first and second portions connecting the flat surface to the first portion on opposite sides of the vertical axis, wherein the second and third portions form lobes that project outwardly from the circle defined by the diameter, the lobes being vertically offset from the horizontal axis by an angular orientation.

11. The piston assembly of claim 9, wherein the piston pin is configured to lift the piston off the piston bore in response to movement of the piston along the cylinder bore.

12. The piston assembly of claim 10, wherein the connecting rod includes a passage to supply fluid to the piston pin.

13. The piston assembly of claim 7, further comprising at least one piston cooling nozzle interface port on an underside of the piston that is configured to direct fluid toward the crown for cooling the piston.

14. The piston assembly of claim 7, wherein upper portion of the piston includes a piston bowl in the crown of the piston, and the lower portion of the piston includes a piston skirt that extends around the piston pin.

15. The piston assembly of claim 14, wherein the upper portion and the lower portion of the piston mate together to form a cooling gallery below the piston bowl.

16. The piston assembly of claim 15, wherein the piston includes at least one inlet that directs fluid toward the cooling gallery to cool the piston and at least one outlet for the fluid to exit the piston.

17. A piston cooling arrangement for an internal combustion engine, the piston cooling arrangement comprising:
    a piston configured to reciprocally move in a cylinder bore of the internal combustion engine; and
    a piston bearing cage provided inside the piston, the piston bearing cage including:
        at least one inlet port for fluid and at least one outlet port for fluid, wherein the at least one inlet port is obliquely angled from an outer perimeter of the piston bearing cage to direct fluid flowing into the piston from a first trajectory that follows the outer perimeter of the piston bearing cage to a second trajectory towards a center location of the piston.

18. The piston cooling arrangement of claim 17, further comprising a crown located at a top of the piston, and wherein the at least one inlet port extends along a trajectory toward a center of the crown, the trajectory being obliquely oriented to a direction of movement of the piston in the cylinder bore.

19. The piston cooling arrangement of claim 17, wherein piston includes a piston pin that connects the piston to a connecting rod, and the at least one inlet port directs the cooling fluid toward an impingement location positioned above the piston pin.

20. The piston cooling arrangement of claim 17, wherein the at least one inlet port includes a first inlet port on a first side of the piston cooling gallery and a second inlet port on a second side of the piston cooling gallery, the second side being opposite the first side.

\* \* \* \* \*